United States Patent [19]
Samuels et al.

[11] Patent Number: 6,022,491
[45] Date of Patent: Feb. 8, 2000

[54] LIQUID CRYSTALLINE POLYMER COMPOSITION

[75] Inventors: Michael Robert Samuels, Wilmington; Marion Glen Waggoner, Hockessin, both of Del.

[73] Assignee: E. I. du Pont de Nemours and Company, Wilmington, Del.

[21] Appl. No.: 09/091,935

[22] PCT Filed: Jan. 2, 1997

[86] PCT No.: PCT/US97/00068

§ 371 Date: Jun. 25, 1998

§ 102(e) Date: Jun. 25, 1998

[87] PCT Pub. No.: WO97/25363

PCT Pub. Date: Jul. 17, 1997

Related U.S. Application Data

[63] Continuation-in-part of application No. 08/583,575, Jan. 5, 1996, abandoned.

[51] Int. Cl.⁷ .......................... C09K 19/52; C09K 19/32; C08G 63/00; C08L 67/00

[52] U.S. Cl. .............................. 252/299.01; 252/299.62; 252/299.67; 524/601; 524/605; 528/190; 528/193; 528/194

[58] Field of Search .................... 252/299.01, 299.5, 252/299.62, 299.64, 299.67; 524/12, 601, 605; 528/176, 190, 194, 193

[56] References Cited

U.S. PATENT DOCUMENTS

| | | | |
|---|---|---|---|
| 4,169,933 | 10/1979 | Jackson, Jr. et al. | 528/190 |
| 4,851,497 | 7/1989 | Wakui et al. | 528/176 |
| 5,079,289 | 1/1992 | Layton et al. | 524/600 |
| 5,097,001 | 3/1992 | Layton et al. | 528/193 |
| 5,110,896 | 5/1992 | Waggoner et al. | 528/190 |
| 5,250,654 | 10/1993 | Alms et al. | 528/193 |
| 5,397,502 | 3/1995 | Waggoner et al. | 252/299.01 |
| 5,492,946 | 2/1996 | Huspeni et al. | 524/12 |
| 5,525,700 | 6/1996 | Samuels et al. | 528/190 |
| 5,710,237 | 1/1998 | Waggoner et al. | 528/190 |

FOREIGN PATENT DOCUMENTS

| | | |
|---|---|---|
| 490346 | 6/1992 | European Pat. Off. . |
| 90/04002 | 4/1990 | WIPO . |

*Primary Examiner*—Shean C. Wu

[57] ABSTRACT

A thermotropic liquid crystalline polymer constituted of repeat units derived from hydroquinone, terephthalic acid, isophthalic acid, 2,6-naphthalene dicarboxylic acid, and 4-hydroxybenzoic acid, all present in defined amounts. Such polymer has excellent physical properties and high temperature stability. It is suitable as a molding resin.

12 Claims, No Drawings

LIQUID CRYSTALLINE POLYMER COMPOSITION

CROSS-REFERENCE TO RELATED APPLICATION

This application is a continuation in part of Ser. No. 08/583,575 filed Jan. 5, 1996 abandoned.

FIELD OF THE INVENTION

This invention concerns a novel liquid crystalline polymer composition containing repeat units derived from hydroquinone, terephthalic acid, isophthalic acid, 2,6-naphthalene dicarboxylic acid and 4-hydroxybenzoic acid. This polymer is especially useful as a molding resin.

TECHNICAL BACKGROUND

Thermotropic liquid crystalline polymers (LCPs) are commercially important being particularly useful as molding resins where certain attributes, such as short molding cycles, low flammability, good moldability, stability at high temperatures, and/or chemical resistance are required. LCPs are used, inter alia, to make automotive parts, electrical and electronic parts such as connectors, and other small or difficult to mold parts.

One drawback to the use of such polymers has been the relatively high price of LCPs, which is partly due to the fairly expensive monomers used in their manufacture. Therefore it it has long been desired to not only find LCPs with improved properties, but also to find such LCPs that could be made from more reasonably priced and readily available monomers.

U.S. Pat. No. 4,169,933 describes the preparation of polymers containing repeat units derived from hydroquinone, terephthalic acid, 2,6-naphthalene dicarboxylic acid and 4-hydroxybenzoic acid. U.S. Pat. Nos. 5,079,289; 5,097,001; and 5,221,730 describe the preparation of polymers containing repeat units derived from hydroquinone, terephthalic acid, isophthalic acid and 4-hydroxybenzoic acid. Polymers of this invention are not described in any of these patents.

U.S. Pat. No. 5,492,946 relates to LCPs, and U.S. Pat. No. 4,851,497 to aromatic polyesters

SUMMARY OF THE INVENTION

This invention concerns a thermotropic LCP containing the following repeat units:

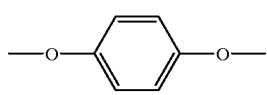
(I)

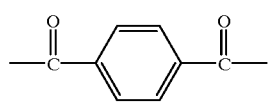
(II)

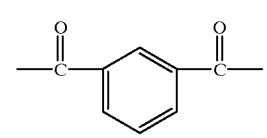
(III)

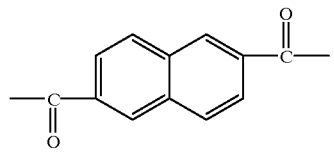
(IV)

and

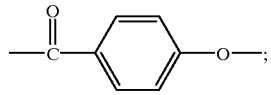
(V)

their respective mole amounts per 100 moles of (I) present in said polymer being as follows:

about 25 to about 65 moles of (II).

about 10 to about 50 moles of (III), about 10 to about 50 moles of (IV), and about 150 to about 400 moles of (V); with the proviso that the total amount of (II)+(III)+(IV) present is 100 moles per 100 moles of (I).

DETAILS OF THE INVENTION

Repeat unit (I) is derived from hydroquinone. The term "derived", as used herein for the purpose of explaining the chemical character of each repeat unit, means that each such unit can be represented by a chemical formula obtained by removing the hydrogen atoms from the hydroxyl groups and removing the hydroxyl groups from the carboxyl groups of the named parent compounds. Repeat units (II). (III), and (IV) are derived, respectively, from terephthalic acid, isophthalic acid, and 2,6-naphthalene dicarboxylic acid. Repeat unit (V) is derived from 4-hydroxybenzoic acid.

In preferred polymers the respective mole amounts of repeat units (II), (III), (IV), and (V) per 100 moles of (I) are as follows, where it is sufficient that at least one of (II), (III), (IV), and (V) satisfy its recited range:

about 30 to about 50 moles of (II), about 15 to about 40 moles of (III), about 15 to about 40 moles of (IV), and about 200 to about 300 moles of (V).

It also is preferred that these polymers have a melting point of about 365° C. or less. more preferably about 350° C. or less.

In addition to the above five principal repeating units (I) through (V), the polymer of this invention may contain small amounts of other units such as, for example, additional modifying dicarboxylic acid and aromatic diol units; for example, 2,7-naphthalene dicarboxylic acid, 1,4-cyclohexane dicarboxylic acid, and resorcinol. It is recognized that some commercially available materials may not have a 100% content of the nominal species or isomer, and that repeating units of unspecified monomers may thus also be present in the polymer. Normally, the total amount of repeating units other than those identified as (I) to (V), if present at all, will be very small, certainly less than about 10 mole % of the total moles, These LCPs can be prepared by methods well known to the those skilled in the art for making aromatic polyesters. For instance, carboxylate esters, such as acetates, of hydroquinone and of 4-hydroxybenzoic acid may be reacted under heat, and later vacuum, with terephthalic, isophthalic, and 2,6-naphthalene dicarboxylic acids to form the desired polymer. Similarly, hydroquinone can be reacted with the phenyl esters of the above dicarboxylic acids and of 4-hydroxybenzoic acid.

The polymers of the present invention have excellent properties, often having high elongation, excellent tensile strength, high melting points and/or high heat deflection temperatures (particularly when filled with fibers, especially glass fibers). This makes them particularly suitable in molding applications wherein good physical properties and/or high temperature resistance are required. In addition, all of the monomers of the LCPs of the present invention are both commercially available and inexpensive. Compositions comprising the polymer of the present invention may contain various additives of the type generally known to one skilled in the art such as, for example, fillers, other polymers, reinforcing agents (other than fibers, mentioned above), pigments, antioxidants, dyes, lubricants, and the like. Useful fillers/reinforcing agents include, in addition to glass fibers, milled glass, talc, titanium dioxide (which also is a pigment), aramid fibers, carbon fibers and Wollastonite. These additives can be added to the polymer in any suitable manner, for example, by using a single screw or twin screw extruder.

This invention is now illustrated by the following representative examples, where all parts, proportions, and percentages are by weight, unless otherwise indicated.

The following abbreviations are used:

1stHt—first heat of the DSC,

2ndHt—second heat of the DSC (after cooling from first heat),

HDT—heat deflection temperature,

Tg—glass transition temperature, IC,

Tm—melting point, IC,

X1 and X3 are temperatures, ° C.: X2 is time, minutes; X4 is time, hours.

The experimental conditions and the results are presented in the tables, below.

EXAMPLES 1–12

Preparation of the LCP

The LCPs were prepared as follows. The reactants were charged, in a nitrogen atmosphere, into a reaction vessel equipped with a Vigreaux column, condenser and a mechanical stirrer (set at 50 rpm). The vessel was heated by a liquid metal bath. The reaction mixture was heated to reflux, which began at about 168° C. and was continued for about 40 minutes without takeoff. During the next 50 minutes, the pot temperature was raised slowly to about X1, during which time byproduct acetic acid was removed by distillation. The pressure was then reduced over approximately time X2 to about 133 Pa (abs.), while the stirrer speed was reduced to 30 rpm, and the pot temperature was increased to about X3. The polymerization was terminated approximately X4 hours after charging the ingredients. The resultant product was removed from the reaction vessel, rapidly cooled to room temperature, and ground. The Tg, Tm, and heat of fusion were determined by DSC at a heating rate of 20° C./min. The Tg was taken as the midpoint of the transition, and the Tm was the peak of the melting endotherm.

Compounding of the LCP with Glass Fibers

The LCPs were each compounded with glass fibers to give a final composition containing 30% by weight of glass fibers. Compounding was done in a 28 mm Werner & Pfleiderer twin screw extruder having a zone with conventional conveying elements, kneading or mixing elements, along with a low pressure zone for venting under vacuum any volatiles from the polymer, and the die. As the compounded LCP compositions exited the die, they were quenched with a water spray and cut into pellets with a strand cutter. The extruder barrel temperatures were 290–340° C., and the die temperature was 340–350° C.

Molding of the LCP Compositions into Test Bars

Prior to molding, the LCP pellets were dried overnight in a vacuum oven, with a nitrogen purge, at 100–130° C. The dried pellets were molded into the test bars required by the various test methods on an Arburg 43 g (1.5 oz.) injection molding machine with barrel temperatures of 350–360° C. and a mold temperature of 100° C. Tensile properties were determined according to ASTM D638. The bars were equipped with strain gauges, since visual results were found to be unreliable. HDTs were determined according to ASTM D648 at 1820 kPa. The results of these tests are given in Table 2.

TABLE 1

| Example Number | Hydroquinone (g.) | terephthalic acid (g.) | isophthalic acid (g.) | 2,6-naphthalene dicarboxylic acid (g.) | 4-hydroxybenzoic acid (g.) | Acetic Anhydride (g.) |
|---|---|---|---|---|---|---|
| 1 | 152.1 | 91.8 | 68.8 | 89.8 | 572.2 | 726.0 |
| 2 | 153.3 | 138.8 | 46.3 | 60.2 | 576.9 | 732.0 |
| 3 | 154.6 | 116.6 | 93.3 | 30.3 | 581.6 | 737.4 |
| 4 | 150.8 | 113.8 | 22.8 | 118.5 | 567.5 | 719.5 |
| 5 | 185.2 | 111.7 | 27.9 | 181.8 | 464.5 | 706.7 |
| 6 | 149.6 | 90.3 | 22.6 | 146.9 | 562.9 | 713.8 |
| 7 | 151.7 | 75.5 | 77.4 | 98.3 | 723.6 | 723.6 |
| 8 | 153.3 | 92.5 | 92.5 | 60.2 | 576.9 | 732.0 |
| 9 | 154.6 | 93.3 | 116.6 | 50.3 | 581.6 | 737.4 |
| 10 | 152.7 | 57.6 | 115.2 | 74.9 | 574.5 | 729.0 |
| 11 | 187.0 | 112.9 | 56.4 | 146.9 | 469.2 | 714.4 |
| 12 | 150.8 | 91.0 | 45.5 | 118.5 | 567.6 | 720.2 |

TABLE 2

| Example Number | Molar Ratio[a] | Tensile Strength (MPa) | Tensile Elongation % | Tm 1st Ht/2nd Ht °C. | Heat of Fusion J/g | HDT °C. | X1 | X2 | X3 | X4 |
|---|---|---|---|---|---|---|---|---|---|---|
| 1 | 100/40/30/30/300 | 29.4 | 2.03 | 339.9/342.5 | 7.4/4.6 | 268 | 350 | 70 | 360 | 7 |
| 2 | 100/60/20/20/300 | 3.2 | 0.51 | 376/374.6 | 9.0/4.5 | 251 | b | b | b | b |
| 3 | 100/50/40/10/300 | 4.3 | 0.5 | 365.5/358.8 | 12.4/11.2 | 226 | b | b | b | b |
| 4 | 100/50/10/40/300 | 14.6 | 1.18 | 350.1/358.6 | 9.1/11.0 | 287 | b | b | b | b |
| 5 | 100/40/10/50/200 | — | — | 313/311 | 3.9/4.8 | — | 370 | 65 | 370 | 5.3 |
| 6 | 100/40/10/50/300 | — | — | 328.6/327.1 | 8.1/7.0 | — | 370 | 65 | 370 | 5.3 |
| 7 | 100/33/34/33/300 | 23.5 | 1.36 | 329.9/328.6 | 4.9/5.6 | 258 | 370 | 50 | 370 | 4.2 |
| 8 | 100/40/40/20/300 | 13.5 | 0.96 | 341.9/343 | 4.6/0.63 | 262 | b | b | b | b |
| 9 | 100/40/50/10/300 | 7.1 | 0.55 | 334/339.2 | 5.4/1.6 | 223 | b | b | b | b |
| 10 | 100/25/50/25/300 | 24.5 | 1.33 | 316.7/312.7 | 2.1/1.1 | 232 | 350 | 80 | 370 | 5.2 |
| 11 | 100/40/20/40/200 | 22.8 | 1.73 | 329.3/316.4 | 3.0/1.5 | 256 | 350 | 70 | 370 | 5.5 |
| 12 | 100/40/20/40/300 | 23.6 | 1.62 | 338.1/337.3 | 7.4/6.2 | 279 | 350 | 70 | 370 | 5.3 |

[a]Hydroquinone/terephthalic acid/isophthalic acid/2,6-naphthalene dicarboxylic acid/4-hydroxybenzoic acid.
[b]Became pasty or solid before or during vacuum cycle, resulting in relatively little or no molecular weight increase.

What is claimed is:

1. A thermotropic liquid crystalline polymer, consisting essentially of the repeat units:

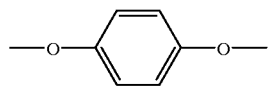
(I)

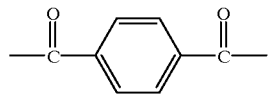
(II)

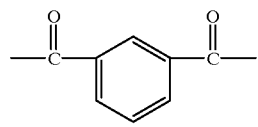
(III)

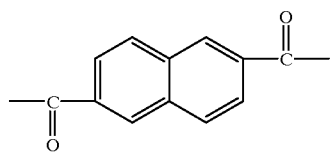
(IV)

and

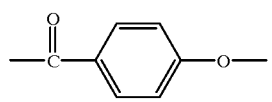
(V)

the respective mole amounts of II, III, IV and V per 100 moles of (I) present in said polymer being as follows:

about 25 to about 65 moles of (II),
about 10 to about 50 moles of (III),
about 10 to about 50 moles of (IV), and
about 150 to about 400 moles of (V);
with the proviso that the total amount of (II)+(III)+(IV) present is 100 moles per 100 moles of (I).

2. A polymer of claim 1 wherein the amount of (II) is about 30 to about 50 moles per 100 moles of (I).

3. A polymer of claim 1 wherein the amount of (III) is about 15 to about 40 moles per 100 moles of (I).

4. A polymer of in claim 1 wherein the amount of (IV) is about 15 to about 40 moles per 100 moles of (I).

5. A polymer of claim 1 wherein the amount of (V) is about 200 to about 300 moles per 100 moles of (I).

6. A polymer of claim 1 wherein the amount of (II) is about 30 to about 50 moles; the amount of (III) is about 15 to about 40 moles; the amount of (IV) is about 15 to about 40 moles; and the amount of (V) is about 200 to about 300 moles, each per 100 moles of (I).

7. A polymer of claim 1 which has a melting point of about 365° C. or less.

8. The polymer as recited in claim 6 which has a melting point of about 365° C. or less.

9. A composition comprising a polymer of claim 1.

10. A composition of claim 9 also comprising at least one additive selected from the group consisting of reinforcing agents, fillers, pigments, stabilizers, antioxidants, dyes, and lubricants.

11. A composition of claim 10 also comprising fibers as fillers or reinforcing agents.

12. A composition of claim 11 wherein said fibers are selected from the group consisting of glass fibers, aramid fibers, carbon fibers and Wollastonite.

* * * * *